United States Patent [19]
Zheng et al.

[11] Patent Number: 5,869,173
[45] Date of Patent: Feb. 9, 1999

[54] COMPOSITE MATERIAL AND METHOD FOR THE PREPARATION THEREOF

[75] Inventors: Qing Zheng; Roger J. Morgan; Robert Jurek, all of Midland, Mich.

[73] Assignee: Board of Trustees operating Michigan State University, East Lansing, Mich.

[21] Appl. No.: 857,872

[22] Filed: May 16, 1997

[51] Int. Cl.$^6$ ...................................................... B32B 3/26
[52] U.S. Cl. .................... 428/313.3; 428/313.5; 428/313.7; 428/313.9; 428/314.8; 428/317.9; 264/45.3; 264/122
[58] Field of Search .............................. 428/313.3, 313.5, 428/313.7, 313.9, 314.8, 317.9; 264/45.3, 122

[56] References Cited

U.S. PATENT DOCUMENTS

| | | |
|---|---|---|
| 3,900,543 | 8/1975 | Davis . |
| 3,902,937 | 9/1975 | Arndt et al. . |
| 4,250,136 | 2/1981 | Rex . |
| 4,403,107 | 9/1983 | Hoffman . |
| 4,447,565 | 5/1984 | Lula et al. . |
| 4,788,230 | 11/1988 | Mudge . |
| 4,919,866 | 4/1990 | Kubbutat . |
| 5,132,061 | 7/1992 | Lindeman et al. . |
| 5,242,637 | 9/1993 | Inoue et al. . |
| 5,492,756 | 2/1996 | Seale et al. . |
| 5,585,054 | 12/1996 | Evans . |

*Primary Examiner*—Rich Weisbergen
*Attorney, Agent, or Firm*—Ian C. McLeod

[57] ABSTRACT

Composite products incorporating a polymer matrix, polymer microspheres, glass microspheres and natural fibers, particularly kenaf are described. The polymer microspheres are 15 to 50 microns in diameter and are smaller that the glass microspheres which are 50 to 200 microns in diameter. The polymer microspheres reduce voids and prevent cracking of the glass microspheres upon compression. The composites have low cost and high strength.

14 Claims, 7 Drawing Sheets

COMPOSITE MATERIAL AND METHOD FOR THE PREPARATION THEREOF

BACKGROUND OF THE INVENTION

Summary of the Invention

The present invention relates to novel composite materials and methods for the preparation thereof. In particular the present invention relates to composite material prepared by a method which uses combinations of relatively large glass microspheres and relatively small polymer microspheres admixed with a solid polymer to provide composite materials having unique physical properties.

Description of Related Art

Syntactic foam materials are mixtures of polymers and hollow microspheres. The resulting composite materials are lighter in weight than the solid polymer.

The patent art is shown by U.S. Pat. Nos. 3,900,543 to Davis, 3,902,937 to Arndt et al; 4,250,136 to Rex, 4,403,107 to Hoffman; 4,788,230 to Mudge; 4,447,565 to Lula et al; 5,242,637 to Inoue et al; 4,919,866 to Kubbutat; 5,132,061 to Lindeman et al; 5,492,756 to Seale et al, and 5,585,054 to Evans.

Davis et al describe buoyant foams using glass or plastic beads. Arndt et al describe a foam containing glass microspheres. Rex describes composite materials made of microspheres (10 to 200 microns) and macrospheres (500 to 15,000 microns) with a polymer as a foam core. Hoffman describes a polymer material containing hollow glass microspheres. Mudge describes syntactic foams prepared by mixing a polymer and microspheres. Lula et al describe microspheres used with a molecular sieve for water absorption. Inoue et al describe composite products with a syntactic foam core. Kubbutat describes a foam containing glass microspheres and an epoxy resin and glass fibers. Lindeman et al describe gaskets made of polymer microspheres. The microspheres are expanded in the formation of the gasket.

The use of kenaf fibers in composite materials is described in U.S. Pat. No. 5,585,054 to Evans and 5,492,756 to Seale et al. These patents do not describe the use of microspheres.

The problem the prior art is faced with is to provide very low cost, higher strength composite materials using microspheres and various natural fibers, particularly kenaf fibers.

OBJECTS

It is therefore an object of the present invention to provide novel composite products and methods for preparing them using natural fibers and microspheres which have superior strengths. Further, it is an object of the present invention to provide composite products which are economical and easy to prepare. These and other objects will become increasingly apparent by reference to the following description and the drawings.

DESCRIPTION OF PREFERRED EMBODIMENTS

Figure 1:
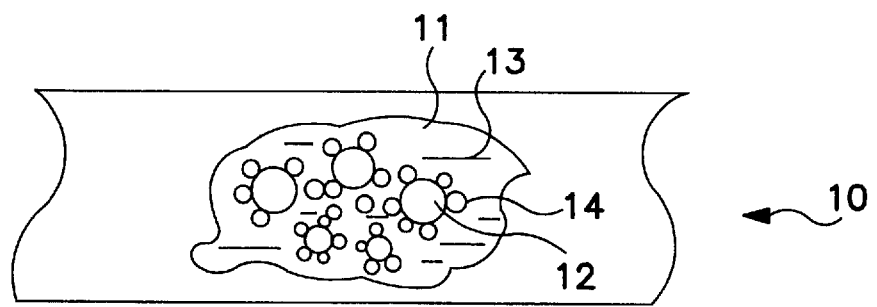
FIG. 1 is a schematic front cross-sectional magnified view of the composite material 10 of the present invention.

The present invention relates to a composite material which comprises in admixture dried natural fibers having a width in a narrow dimension of between 40 and 60 microns and a length between about 0.6 and 2.5 cm; hollow first microspheres of a polymer having a diameter between about 15 and 50 microns and larger than the first microspheres; hollow second microspheres of glass having a diameter between about 50 and 200 microns which are larger than the first microspheres; and a cured polymer matrix, wherein the weight ratio of fibers to first and second microspheres is between about 10 to 7 and 10 to 9. Preferably the composite material has a density between about 0.3 and 0.7 g/cc.

Further, the present invention relates to a method for preparing a composite material which comprises mixing hollow first microspheres of a polymer having a diameter between about 15 and 50 microns with a liquid polymer to provide a first mixture; mixing hollow second microspheres of glass having a diameter between about 50 and 100 microns and larger than the first microspheres into the first mixture of step (a) to produce a second mixture; mixing natural fibers having a narrow dimension of 40 to 60 microns and lengths between about 0.6 and 2.5 cm into the second mixture to provide a third mixture; introducing the third mixture in a mold so as to produce the composite material.

The materials of the present invention are preferably compression molded preferably between 35 and 500 psi. Increasing pressure provides increasing density.

The development of the preferred composite material of the present invention involved material survey and selection, material processibility, performance and aesthetics as follows:

1. Material survey and selection:
   Survey: Polymer thermoplastic or thermoset capable of forming stiff, strong, foamed homogeneous compression moldable sheets.
   Selection decision: based on potential cost/performance/processibility.
2. Processibility:
   Compression molding of foamed sheets and board.
3. Performance Evaluation:
   Flexural modulus and strength of developed material will be measured as initial performance evaluation. The material is tested following NEMA (National Electrical Manufacturers Association) standards.
4. Aesthetics:
   Fillers, additives
   colors (combination of different colors for polymer and fillers).

An "Integral Foam" is a foam with a cellular core structure and a relatively smooth (harder) skin, which can be prepared by the method of the present invention. The structure of an integral foam gives it high rigidity and bending/shear strengths. Wood is 5 to 10 times stiffer than integral foam. In all other respects, integral foam equals or exceeds wood's performance. It does not rot or absorb water nor is it a source of nourishment for insects. Large surface areas will not warp, split or splinter. Integral foams have the appearance, feel, weight and sound of wood.

Integral foam parts can be fastened using the same methods as with wood. Screws, staples, and nails have approximately the same retention properties as in wood. Joining elements such as tongues, grooves, dovetails, as well as mortice and tenon can be molded into the mating parts, saving assembly operations and providing excellent joint strength.

Integral foam can be made to look very much like wood with color and graining molded in, and the surface can be finished with stains, waxes, varnish, and the like. Unlike wood, an integral foam does not possess a porous surface and so it resists discoloration.

The properties of integral foams change widely as a function of the method of manufacture, secondary treatment techniques, composition, density, dimension and shape etc. Among these factors, density is the most important parameter which determines the mechanical properties of the integral foam. A recent study shows that the tensile strength of polycarbonate foams is proportional to the foam density. It was also found that the relative tensile modulus of the foam increases as the square of the foam's relative density. However, these simple relationships between flexural strength or modulus and density of the foams are not universal for all polymer foams.

The composite products of the present invention are syntactic foams. As previously discussed, a "syntactic foam" is made using a resin matrix to which has been added hollow spheres of various materials. The resulting product is a closed cell foamlike material which is made without the use of a blowing agent. The most common matrix resins are epoxies and polyesters, although urethanes, PVC plastisols, and phenolic resins have also been used. Indeed, any polymer which can be made liquid, either before final polymerization or by heat, can be used as the binding matrix.

Syntactic foams are made by simply mixing the microspheres into the catalyzed resin until the desired consistency is obtained. In most cases the materials are mixed to a puttylike state or, if a casting material is desired, to a state in which the material can just be cast. The usual ratio of filler to resin is approximately 60% filler by volume.

A syntactic foam provides a weight reduction with better resultant physical properties than if the polymer had been foamed by chemical or physical means to the same specific gravity. The synthetic wood product made from resins and hollow spheres has the feel, look, and texture of real wood. Generally, the property improvements gained from using hollow glass beads are: water resistance, compressive strength, shrinkage and impact strength. Other significant advantages derived from utilizing hollow spheres are: low density; chemical stability and inertness; and crack arresting characteristics, which results in easy machining, sanding, nailing, and finishing.

In the present invention, the glass microspheres are larger than the polymer microspheres. The polymer microspheres fill in the interstices between the glass microspheres so that discontinuities in the composite material are reduced or eliminated and the strengths are increased. Further, the small polymer microspheres cushion the glass microspheres to prevent them from breaking. FIG. 1 is a sketch showing the composite material 10 which uses the polymer 11 as a matrix containing the relatively large glass microspheres 12, the fibers 13 and the relatively small polymer microspheres 14. The preferred ratio of the diameters of the glass microspheres to polymer microspheres is between about 5 to 1 and 2 to 1. The glass microspheres are between about 50 and 200 microns in diameter. The polymer microspheres are between about 15 and 50 microns.

The fibers used in the present invention are dried natural fibers with hair-like projections from a main body of the fiber. Kenaf fibers are preferred, particularly kenaf fibers which have been screened or sorted to the required dimensions. Other fibers include woody plant fibers of various species, particularly those where the fibers have the hairy projections along their length. Such fibers are well known to those skilled in the art. The fibers have a width or a narrow dimension of between 40 and 60 microns and lengths between about 0.6 and 2.5 cm.

The glass microspheres can be made of recycled glass. The polymer microspheres can be composed of any polymer which does not dissolve during the formation of the composite material. With the preferred polyester resins of the present invention, the polymer microspheres are composed of a copolymer of vinylidene chloride and acrylonitrile. Cost is also a significant factor in the preferred polymer microspheres. Recycled polymers can be used as a source for producing the microspheres. The matrix polymers can be selected from:

| | |
|---|---|
| Acrylonitrile-butadiene-styrene copolymer | (ABS) |
| Polytetrafluoroethylene | (PTFE) |
| Polycarbonate | (PC) |
| High-density polyethylene | (HDPE) |
| Low-density polyethylene | (LDPE) |
| Low-low-density polyethylene | (LLDPE) |
| Polypropylene | (PP) |
| Polyurethane | (PUR) |
| Polyethylene terephthalate | (PET) |
| Poly-(butylene terephthalate) | (PBT) |
| Poly(vinyl chloride) | (PVC) |
| Polyetheretherketone | (PEEK) |
| Poly(phenylene oxide) | (PPO) |
| Polyetherimide | (PEI) |
| Polyphenylene sulfide | (PPS) |

Most preferred are polyester polymers; particularly STYPOL200 40-3951 (Cook Composites and Polymers Co., Kansas City, Mo.) which is a general purpose molding resin particularly where metal dies are used. This polymer produces a high gloss finish and very good physical properties. It is catalyzed by benzoyl peroxide (Cadox E paste), 40% emulsion (Cook Composites). The polymers can be thermoset or thermoplastic. The polymers are liquid for molding.

An advantage of the present invention is that complex shapes can be easily produced since the fibers are discontinuous and can conform to the mold. A further advantage is that voids are avoided. The molds can be metal or any material which allows the molding. Metal molds are preferred for compression molding. The compression can be up to the point where the glass microspheres collapse, which in the preferred composite materials described herewith is between about 35 and 250 psi (0.241 to 1.73 MPa), which is about the crushing point of the glass sphere. Up to 500 psi (3.45 MPa) can be used with some glass spheres.

Figure 2:
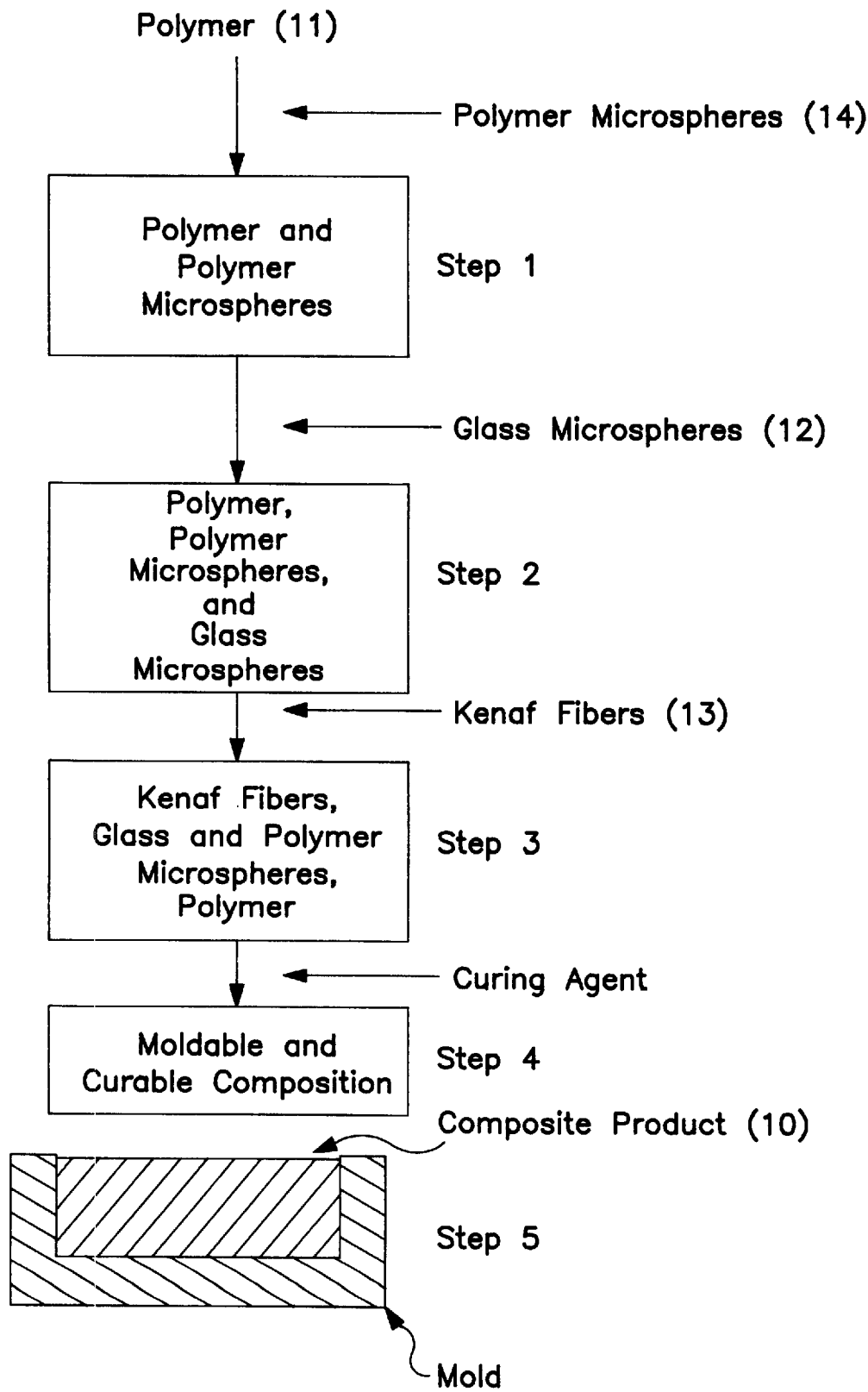
FIG. 2 is a schematic view showing the steps in the method of the present invention.

In the method of the present invention the order of addition of the ingredients is important as shown in FIG. 2. The polymer microspheres are mixed with the liquid resin first in order to provide uniform dispersion. Then the glass microspheres are added to the mixture so that the polymer microspheres surround the glass microspheres. The natural fibers are then blended into the mixture. The curing agent if any, can be added at any point so long as the mixture remains sufficiently fluid for molding.

Glass microspheres:

(1) K-1 from 3M. (Minneapolis, Minn.) Size: 20 μm to 90 μm,

Average particle density: 0.125 g/cc (7.8 pcf) Strength—% Collapse: 250 psi (1.73 MPa), 10%

(2) ECCOSPHERE EP from Emerson & Cuming, Inc. Canton, Mass.

Size: 40 to 150 μm

Average particle density: 0.25 g/cc (15.6 pcf)

Strength—% Collapse: 500 psi (3.45 MPa), 14%

Polymer Microspheres:

EXPANCEL 551, Expancal ICN, Duluth, Ga.

Kenaf Fibers: Mississippi State University

Polymer polyester resin and 1 wt % catalyst benzoyl peroxide were well mixed in a plastic beaker at room temperature first. The mixture then was degassed in a vacuum oven for 10 min. at 50° C. After degas, weighted hollow spheres were added to the mixture and well mixed with polyester resin. For up to 40 vol % microspheres contents, liquid molding method (no pressure was applied during casting) was employed because the viscosity was low for these samples. However, for 60% (volume percent) and higher microspheres content samples, compression molding was performed using a Tetrahedron press with the following processing conditions:

The preferred heating is from room temperature to 200° F. The heating rate was 10° F./minute; dwell one hour, the compression force was set at 2,000 lb. (746 kg) (minimum setting of the equipment) for 6"×2" (15.2×5 cm) mold and 11,000 lb. (4,10 3 kg) for 8"×8" (20.3×20.3 cm) mold.

COMPARATIVE EXAMPLE 1

Figure 3:
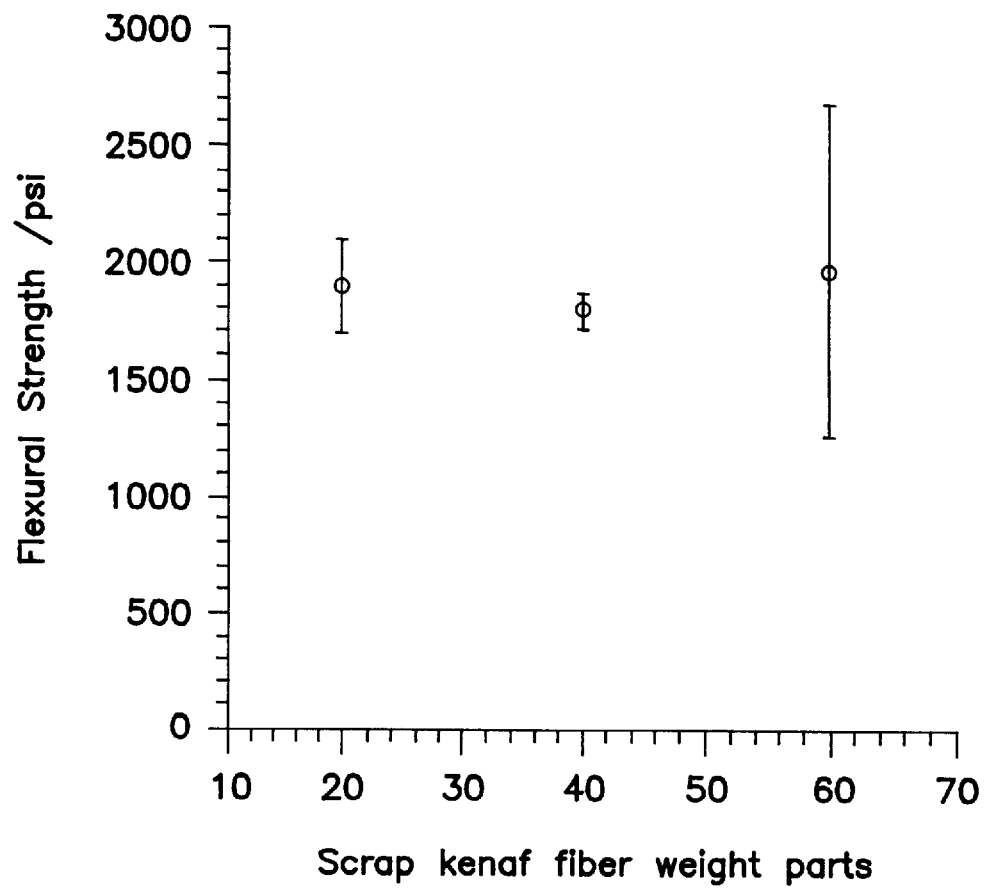
FIG. 3 is a graph showing the weight parts of scrap kenaf vs flexural strength as in comparative Example 1.
Figure 4:
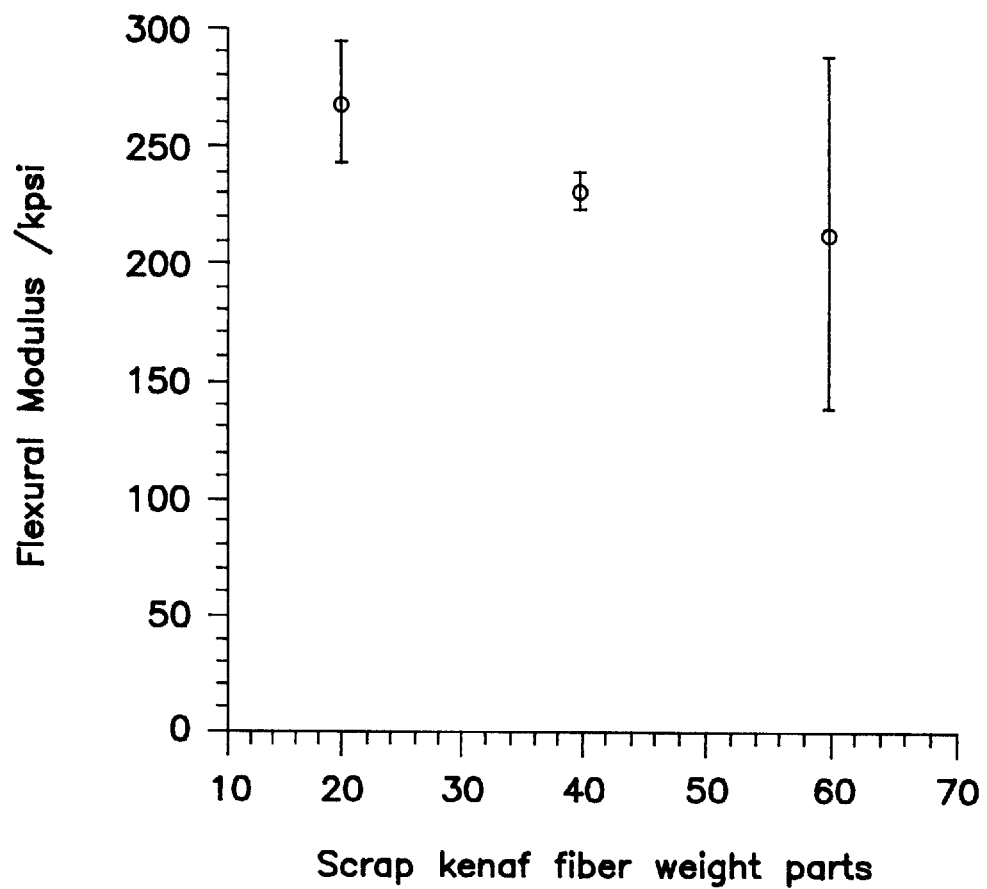
FIG. 4 is a graph showing the weight parts of scrap kenaf vs flexural modulus as in comparative Example 1.

In order to lower the cost of the composite materials, kenaf fiber, was used. The driving forces behind the use of kenaf fiber are not only cost, but also annually renewable utilization and environmental benefits. Because kenaf fiber has superior toughness and large aspect ratio compared to other fibers, it has high potential as a reinforcing fiber in polymer composites. The composites with 100 weight parts of polyester, 45 parts of glass microspheres and 20 to 60 parts of kenaf fiber have been processed and tested. The densities of these three component composites are in the range of 31 to 37 pounds per cubic foot (496.6 kg per cubic meter to 592.7 kg per cubic meter). The mechanical testing results are shown in FIGS. 3 and 4 for flexural strength and modulus, respectively.

The densities and strengths were not satisfactory. The flexural strength of the system are about 2000 psi for all compositions. The modulus decreases slightly with increasing of kenaf fiber parts. However, for 60 parts fiber, a large scatter were observed in both strength and modulus data. The reason for this scatter is that the kenaf used is scrap which contains about half fibers and half chunks (in few mm size). More kenaf chunks in specimen made the material weaker, which was confirmed by existence of failed kenaf chunks on the fracture surfaces.

COMPARATIVE EXAMPLE 2

The raw material mixture had always been vacuumed before compression molding. Eliminating the degas procedure lowers the cost of this process. Two runs were carried out to answer the question. Runs 1 and 2 were almost identical except one had the degas procedure an the other did not. Table 1 lists the flexural strength and modulus data for both runs for comparison. The results show that the degas before molding is not critical to the mechanical properties. The strength and modulus were almost the same for both runs. Table 1. Comparison of mechanical properties for degassed and non-degassed specimens with Polyester(100)/Glass microspheres(45)/Kenaf fiber(40)

TABLE 1

Comparison of mechanical properties for degassed and non-degassed specimens with Polyester(100)/Glass microspheres(45)/Kenaf fiber(40)

| | Flexural Strength/psi | Flexural Modulus/kpsi | Density/pcf |
|---|---|---|---|
| Run 1, degassed | 1754 (12.1 MPa) | 228 (1573.2 MPa) | 31.0 (496.6 kpcm) |
| Run 2, not degassed | 1802 (12.43 MPa) | 228 (1573.2 MPa) | 31.0 (496.6 kpcm) |

COMPARATIVE EXAMPLE 3

EXPANCEL 551 (Expancal ICN, Duluth, Ga.) is the trade name for polymeric microspheres which are white, spherically formed particles with a shell consisting basically of a copolymer of vinylidene chloride and acrylonitrile. The polymeric shell encapsulates the blowing agent, liquid isobutane, under pressure. The reasons to try EXPANCEL instead of glass microspheres are, 1) it is cheaper, and 2) more importantly, it was expected to improve the material surface property. The glass microspheres are too brittle, and easy to crush under a pin pressure.

After a few runs, however, it was found that the EXPANCEL/polyester and EXPANCEL/polyester/kenaf fiber systems were very difficult to process. 1) The viscosity of the EXPANCEL—polyester mixture is much lower than the glass microspheres—polyester. Even for 80 vol % EXPANCEL, the mixture was squeezed out of the mold during the process; 2) The release agent which is compatible with polyester is incompatible with EXPANCEL; 3) The EXPANCEL is not stable at the cure condition of polyester.

EXAMPLE 4

To solve the problems of comparative Examples 1 to 3, a mixture of EXPANCEL and glass microspheres was added to the polyester—kenaf fiber system. The first try was successful. With a combination of 30 parts glass microspheres (42.6 vol %) and 3 parts of EXPANCEL (29.0 vol %) in 100 parts polyester (28.4 vol %), the specimen prepared by compression molding was very good with smooth surfaces and a density of 28.8 pcf (calculated density is 28.9 pcf; 463 kpcm).

EXAMPLE 5

It was found that the price of the ECCOSPHERE glass microspheres is about 30 dollars a pound. Obviously it is too expensive. However, 3M's glass microspheres have almost the same physical properties but the price is only 2 dollars per pound. Two runs were carried out to verify the difference between using two microspheres. The results are shown in Table 2.

TABLE 2

Comparison of ECCOSPHERE. and 3M glass microspheres. WP is weight parts.

| Run | Polyester (WP) | Eccosphere (WP) | 3M-15 (WP) | Expancel (WP) | Kenaf (WP) | Flexural Strength (psi)[1] | Flexural modulus (Kpsi)[2] | Density (pcf)[3] |
|---|---|---|---|---|---|---|---|---|
| 1 | 100 | — | 30 | 3 | 20 | 2125 | 243 | 33.9 |
| 2 | 100 | 30 | — | 3 | 20 | 2032 | 256 | 33.2 |

[1]Mpa multiply by $6.9 \times 10^{-3}$
[2]Ksi multiply by 6.9
[3]Pounds per cubic foot multiply by 16.02

EXAMPLE 6

Figure 5:
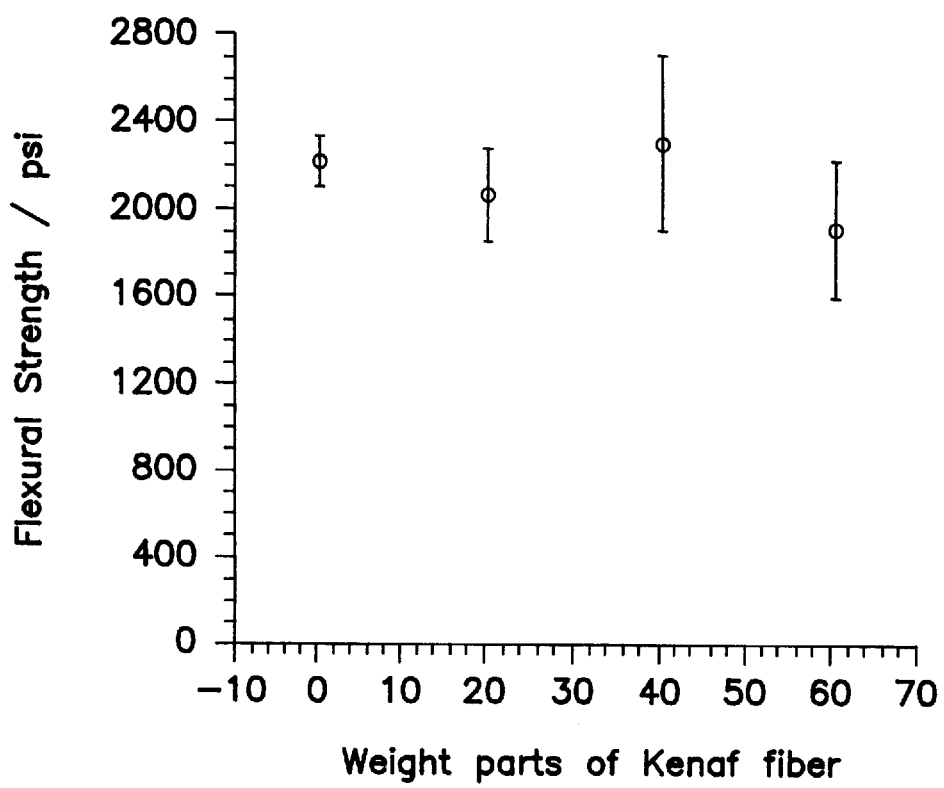
FIG. 5 is a graph showing the weight parts of kenaf scrap vs flexural strength as in Example 6.
Figure 6:
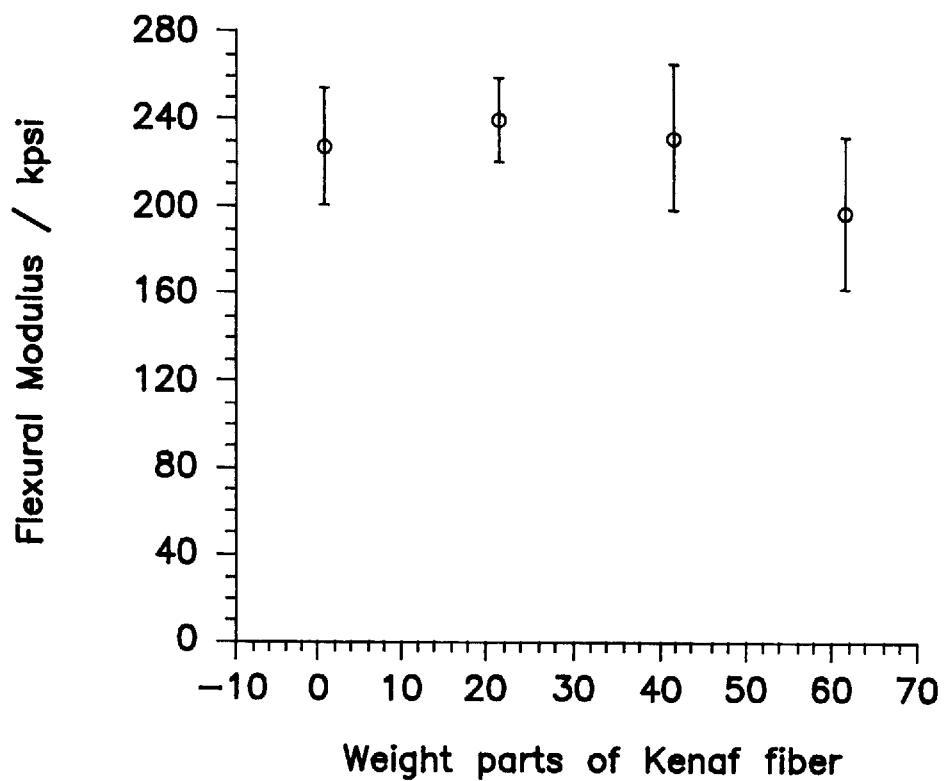
FIG. 6 is a graph showing the weight parts of kenaf scraps vs flexural modulus as in Example 6.

Four component (polyester, glass microspheres, EXPANCEL and kenaf fiber) samples were prepared by compression molding. Table 3 lists the weight parts of each component and flexural strength and modulus of the specimens. In FIGS. 5 and 6, the flexural strength and modulus were plotted against the weight parts of kenaf fiber.

TABLE 3

Polyester-glass microspheres-EXPANCEL-Kenaf fiber systems

| Polyester | Glass bubble | Expancel | Kenaf | Flexural Strength (psi)[1] | Flexural Modulus (ksi)[2] | Density (ppcf)[3] |
|---|---|---|---|---|---|---|
| 100 | 30 | 3 | 0 | 2213 | 227 | 28.8 |
| 100 | 30 | 3 | 20 | 2125 | 243 | 33.9 |
| 100 | 30 | 6 | 40 | 2318 | 234 | 32.0 |
| 100 | 30 | 6 | 60 | 1933 | 200 | 32.0 |

[1]Mpa multiply by $6.9 \times 10^{-3}$
[2]Ksi multiply by 6.9
[3]Pounds per cubic foot multiply by 16.02

EXAMPLE 7

Because kenaf scrap contains a large amount of "wood like" chunks, the more kenaf added into system, the more voids and weak points existed in the specimen. A test run showed a big improvement if the screened kenaf fibers were used. The hairy kenaf fibers are brown colored, 40–60 microns in diameter with an average aspect ratio <20. The flexural strength of 100 parts polyester—45 parts glass microspheres—40 parts screened kenaf fiber is 2517 psi (17.37 MPa) and the modulus 367,000 psi (2532 MPa) (see Table 4).

COMPARATIVE EXAMPLE 8

A few specimens were prepared and tested for comparison with three or four component materials described above. The results are listed in Table 4.

TABLE 4

Data of Other combinations. WP = weight parts

| Polyester (WP) | Glass Bubble (WP) | Kenaf Scrap (WP) | Screened Kenaf (WP) | s-2 Chopped Glass (WP) | Flexural Strength (psi)[1] | Flexural Modulus (kpsi)[2] | Density (pcf)[3] |
|---|---|---|---|---|---|---|---|
| 100 | 45 | — | — | 40 | 2151 | 258 | 39 |
| 100 | — | 20 | — | — | 3667 | 274 | 55 |
| 100 | 45 | — | 40 | — | 2517 | 367 | 39 |

[1]Mpa multiply by $6.9 \times 10^{-3}$
[2]Ksi multiply by 6.9
[3]Pounds per cubic foot multiply by 16.02

Figure 7:
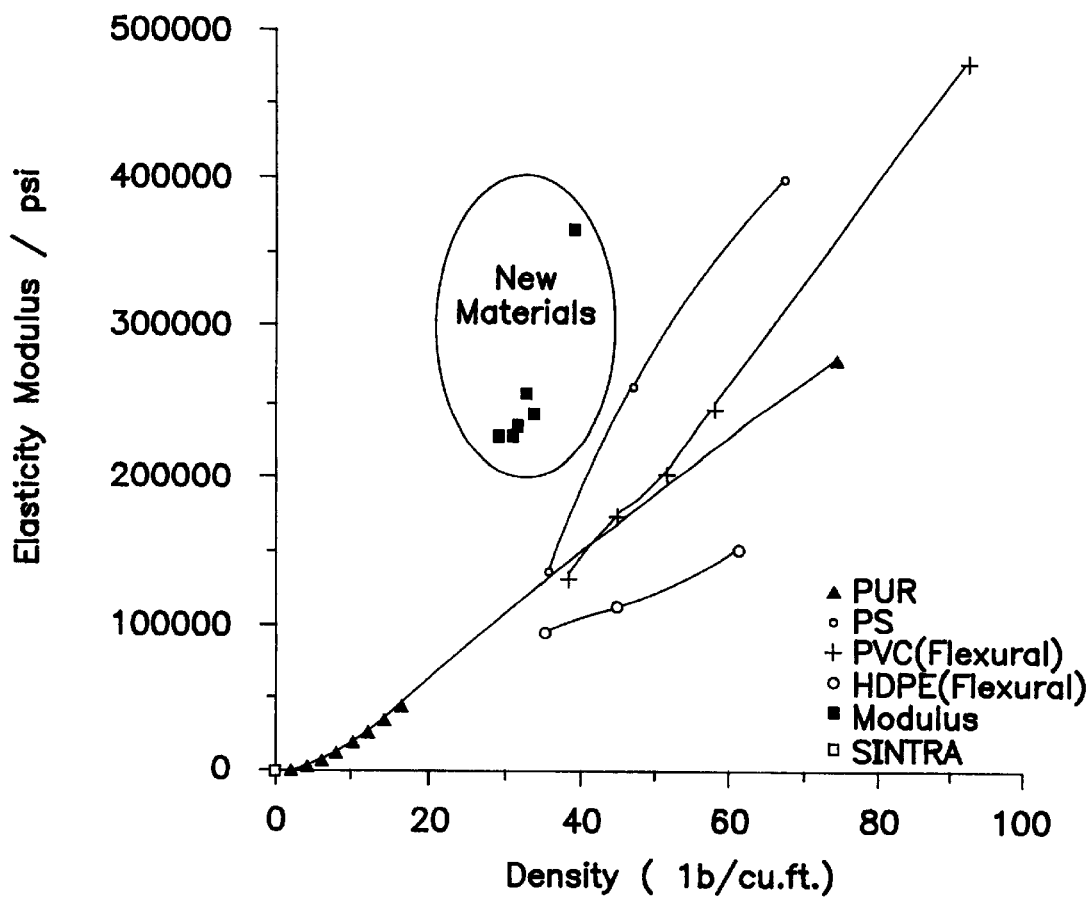
FIG. 7 is a graph showing a comparison of flexural modulus of commercial foams and the new composite materials of the present invention.

It was found that for the polyester-glass-microspheres-EXPANCEL-scrap kenaf fiber system of the present invention, the density can be reduced to about 25 to 30 pounds per cubic foot with a typical flexural strength of about 2000 psi (13.8 MPa) and modulus of about 250,000 psi (1725 MPa). The system shows a doubling in flexural modulus compared to commercial polymeric foams. See FIG. 7. The system can be modified and improved by using screened kenaf fibers. With low density, low cost of raw materials and easy processing, the potential market for the system is very promising.

Materials Cost Analysis

Units used in this analysis:

Cost, price: ($) in US dollar, (¢) in cent

Density: (pcf) pound per cubic foot

Weight: (lb) pound

Volume: (bf) board foot (1"×12"×12")

TABLE 5

Raw Materials Costs*

| | Polyester | 3M-K15 Glass Micro-spheres | EXPANCEL 551 Plastic Microspheres | Kenaf |
|---|---|---|---|---|
| Price ($/lb) | 0.80 | 2.00 | 10.00 | 0.10 |
| Density (pcf) | 75 | 15 | 2.2 | ~35 |

TABLE 5-continued

Raw Materials Costs*

|  | Polyester | 3M-K15 Glass Micro- spheres | EXPANCEL 551 Plastic Microspheres | Kenaf |
|---|---|---|---|---|
| Price per board foot Pure Material ($) | 5 | 2.5 | 1.75 | 0.29 |

*The prices in Table 5 vary ±10% in the market.

TABLE 6

The material costs of the most promising composite systems so far.

Weight Parts (cost of raw material in one LB composite)

| Poly- ester | 3M-K15 Glass Micro- spheres | EXPANCEL 551 Plastic Micro- spheres | Kenaf | expected density (pcf) | Cost ($/bf) |
|---|---|---|---|---|---|
| 100 (51¢) | 30 (38¢) | 6 (38¢) | 20 (1¢) | 23.5 | 2.51 |
| 100 (45¢) | 30 (34¢) | 6 (34¢) | 40 (2¢) | 24.4 | 2.34 |
| 100 (41¢) | 30 (31¢) | 6 (31¢) | 60 (3¢) | 25.2 | 2.23 |
| 100 (54¢) | 20 (27¢) | 9 (60¢) | 20 (1¢) | 20.3 | 2.41 |
| 100 (47¢) | 20 (24¢) | 9 (53¢) | 40 (2¢) | 21.4 | 2.25 |
| 100 (42¢) | 20 (21¢) | 9 (48¢) | 60 (3¢) | 22.3 | 2.12 |

All of the above composite systems are processible. For the above four component systems, the cost of composite is very difficult to reduce to below 1 dollar per board foot, unless the weight parts of kenaf is more than 500 (80 wt %).

The following examples further show the preparation of light weight, low cost composite materials using glass and plastic hollow microspheres, unsaturated polyester and kenaf. The cost, mechanical properties, processibility and the density of materials were optimized. New, light weight composite materials with densities in the range of 0.3 to 0.7 g/cc (20 to 42 lb/cf) and flexural modulus in the range of 200,000 to 300,000 psi (1380 MPa to 2070 MPa) were developed. From a weight-performance viewpoint, the new materials are superior to the other commercial light weight materials (foams or integral foams). The material has a cost range from $1.5 to $2.5/board foot.

The overall goal was to develop new filled, foamed polymer composite structures with superior economic/performance attributes. The new light-weight, low-cost material needed to cost less than $3 per board foot, have a density of less than 35 pounds per cubic foot with properties that meet industrial standard specifications.

EXAMPLE 9

In order to lower the cost, it is important to ascertain how the kenaf fiber volume fractions affect the composite properties. The kenaf fibers used here were all screened. Table 8 lists the specimens with more EXPANCEL and kenaf fibers:

TABLE 8

| No. | Poly- ester | Glass Micro- spheres | EXPAN- CEL 551 | Kenaf | Dimen- sion inches[1] | Den- sity pcf[2] | Pres- sure psi[3] |
|---|---|---|---|---|---|---|---|
| 1 | 100 | 30 | 6 | 60 | 2 × 6 thin | 56 | 142 |
| 2 | 100 | 30 | 6 | 60 | 2 × 6 thin | 56 | 142 |
| 3 | 100 | 30 | 6 | 60 | 8 × 8 thick | 42 | 47 |
| 4 | 100 | 20 | 9 | 54 | 8 × 8 thin | 37 | 31 |
| 5 | 100 | 20 | 9 | 80 | 8 × 8 thin | 38 | 47 |

[1]cm multiply by 2.54
[2]kpcm multiply by 16.02
[3]MPa multiply by 6.9 × 10$^{-3}$ The large difference between non-screened kenaf fiber and screened fiber is the density of material obtained as a function of pressure applied during molding. For non-screened fiber, the molding pressure of 250 psi (1.73 MPa) was used, and the average density of a 40 parts kenaf was about 33 pcf (528.7 kpcm). However, for screened kenaf fiber, the density of composites are much higher than that of nonscreened kenaf fiber using the same pressure. The mechanical properties of the specimen listed in Table 8 are in Table 9.

TABLE 9

| Sample Number | Process Temp °F.[1] | Process Pressure *(psi)[2] | Density (pcf)[3] | Flexural Modulus (ksi)[4] | Flexural Strength (psi)[5] |
|---|---|---|---|---|---|
| 1 | 220 | 142 | 56 | 531 | 6048 |
| 2 | 200 | 142 | 56 | ** | ** |
| 3 | 200 | 47 | 42 | ** | ** |
| 4 | 200 | 31 | 37 | 282 | 3543 |
| 5 | 200 | 47 | 38 | 286 | 3864 |

[1]°C. = 5/9 (°F.-32)
[2]MPa multiply by 6.9 × 10$^{-3}$
[3]Kpsm multiply by 16.02
[4]MPa multiply by 6.9
[5]MPa multiply by 6.9 × 10$^{-3}$ Sample 1 shows good mechanical properties, however the density is high. Sample 2 is the same as sample 1, and is not tested. Sample 4 shows a typical number in strength and modulus for this formulation: strength about 3500 psi (24.2 MPa) and modulus about 300 ksi (2070 MPa). Sample 5 had more kenaf fiber, however, it shows a better property in modulus.

EXAMPLE 10

In order to make table top sized prototype, a silicone mold was made to replace the steel mold, which is very expensive. The silicone rubber was from Dow Corning, Midland, Michigan HS II RTV.

Samples were molded using both a small press and a big press for low density materials, i.e. polyester- glass microspheres-EXPANCEL-kenaf. One table top sized prototype has been used to make a prototype table. The maximum pressure for a 2.5×3 (76.2×91.4 cm) foot table top has about 300 psi using the large press. The maximum molding area is about 14×14"(35.6×35.6 cm) for the small press.

EXAMPLE 11

The colorants were from FERRO Corp. PDI Type 11 (N.J.) is for unsaturated polyester resin. Using the formulation of 100 (polyester):30 (K-15 microspheres):6 (EXPANCEL):40 (kenaf fiber) : 1-2 (Pigment), the following samples were made.
1) Blue, 1 part by weight, scrap kenaf fiber, 8×8" (20.3×20.3 cm) plate, density 35.4 lb/cf (567.1 kpcm) 2) Blue, 2 parts by weight, scrap kenaf fiber, 8×8" (20.3×20.3 cm) plate, density 30.9 lb/cf (495 kpcm) 3) Gold, 2 parts by weight (2:1 yellow:orange), screened kenaf fiber, 8×8" (20.3×20.3 cm) plate, density 39.6 (634.45 kpcm) 4) Orange, 2 parts by weight, scrap kenaf fiber, 8×8" (20.3×20.3 cm) plate, density 34.0 pcf (544.7 kpcm) 5) Orange, 2 parts by weight, screened kenaf fiber, 8×8" (20.3×20.3 cm) plate, density 42 pcf (672.8 kpcm) 6) Green, 2 parts by weight, screened kenaf fiber, 8×8" (20.3×20.3 cm) plate, density 40.7 pcf (652 kpcm) 7) Purple, 1.4 parts by weight (2.3:0.5 red:green), screened kenaf fiber, 8×8" (20.3×20.3 cm) plate, 42.0 pcf (672.8 kpcm)

Thus, it was found that for the polyester glass microspheres—EXPANCEL—Scrap kenaf fiber system, the density can be reduced to about 25 to 30 pounds per cubic foot (400.5 kpcm to 480 kpcm) with a typical flexural strength of about 2000 psi (13.8 MPa) and modulus of about 250,000 psi (1725 MPa). The system exhibits a double the flexural modulus of commercially available polymeric foams. For light weight (about 35–40 pcf; 560 to 640.8 kpcm) materials, the formulation of 100 (polyester):30 (k-15):9–12 (EXPANCEL) :40–80 (kenaf fiber):1–2 (pigment) was the optimum combination. The materials had good aesthetics appearance, good mechanical properties (flexural strength and modulus), and were compatible with clear coat.

It is intended that the foregoing description be only descriptive of the present invention be limited only by the herein after appended claims.

We claim:

1. A composite material which comprises in admixture:
   (a) dried natural fibers having a width in a narrow dimension of between 40 and 60 microns and a length between about 0.6 and 2.5 cm;
   (b) hollow first microspheres of a polymer having a diameter between about 15 and 50 microns and larger than the first microspheres;
   (c) hollow second microspheres of glass having a diameter between about 50 and 200 microns which are larger that the polymer microspheres; and
   (d) a cured polymer matrix, wherein the weight ratio of fibers to first and second microspheres is between about 10 to 7 and 10 to 9.

2. The composite of claim 1 wherein the first microspheres are essentially insoluble in a liquid polymer which forms the cured polymer.

3. The composite of any one of claims 1 or 2 wherein the cured polymer is a cured polyester polymer.

4. The composite material of claim 1 wherein the first microspheres are composed of a copolymer of vinylidene chloride and acrylonitrile.

5. The composite material of any one of claims 1 or 2 which has been compression molded.

6. The composite material of claim 1 wherein the first microspheres are composed of a copolymer of vinylidene chloride and acrylonitrile, the cured polymer is a polyester polymer and the natural fiber is kenaf fiber.

7. The composite material of claim 6 which has been compression molded.

8. A method for preparing a composite material which comprises:
   (a) mixing hollow first microspheres of a polymer having a diameter between about 15 and 50 microns with a liquid polymer to provide a first mixture;
   (b) mixing hollow second microspheres of glass having a diameter between about 50 and 100 microns and larger than the first microspheres into the first mixture of step (a) to produce a second mixture;
   (c) mixing natural fibers having a narrow dimension of 40 to 60 microns and lengths between about 0.6 and 2.5 cm into the second mixture to provide a third mixture;
   (d) introducing the third mixture in a mold so as to produce the composite material.

9. The method of claim 8 wherein the first microspheres are essentially insoluble in the liquid polymer during the curing.

10. The method of any one of claims 8 or 9 wherein the liquid polymer is a polyester polymer which is admixed with a curing agent.

11. The method of claim 8 wherein the first microspheres are composed of a copolymer of vinylidene chloride and acrylonitrile.

12. The method of claim 8 wherein the first microspheres are composed of a copolymer of vinylidene chloride and acrylonitrile, the liquid polymer is a polyester polymer, and the natural fibers are kenaf fibers.

13. The method of any one of claims 8, 10, 11 or 12 wherein the composite material is compressed in the mold.

14. The method of claim 8 wherein the compression molding is at a pressure of between about 35 and 500 psi.

* * * * *